E. F. PRICE.
PROCESS OF EFFECTING REDUCTION AND PRODUCING FERROCHROMIUM.
APPLICATION FILED JUNE 26, 1907.
995,481.
Patented June 20, 1911.
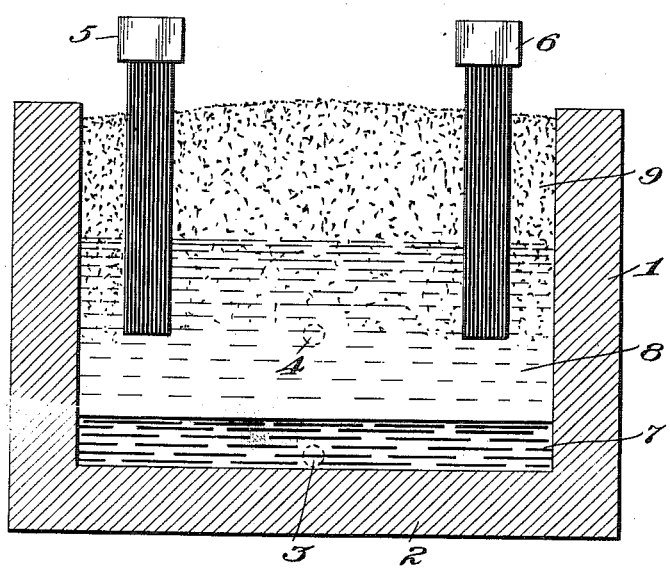
Witnesses:
Inventor:
Edgar F. Price,
by Byrnes & Townsend,
Att'ys.

UNITED STATES PATENT OFFICE.

EDGAR F. PRICE, OF NIAGARA FALLS, NEW YORK, ASSIGNOR, BY MESNE ASSIGNMENTS, TO CENTRAL TRUST COMPANY OF NEW YORK, TRUSTEE, A CORPORATION OF NEW YORK.

PROCESS OF EFFECTING REDUCTION AND PRODUCING FERROCHROMIUM.

995,481.           Specification of Letters Patent.     Patented June 20, 1911.

Application filed June 26, 1907. Serial No. 380,922.

*To all whom it may concern:*

Be it known that I, EDGAR F. PRICE, a citizen of the United States, residing at Niagara Falls, in the county of Niagara and State of New York, have invented certain new and useful Improvements in Processes of Effecting Reduction and Producing Ferrochromium, of which the following is a specification.

In the production of ferrochromium from chromite it is customary to introduce a small charge of the ore, carbon, and a flux into an electric furnace having sides and a hearth of carbon and to spring an arc between the hearth and a depending carbon electrode having its lower end embedded in the charge. The potential difference usually maintained between the terminals of the furnace is one hundred and ten volts. As the ore is reduced a layer of the ferrochromium accumulates on the hearth, covered by a layer of slag. The molten alloy is tapped out from time to time until the slag has increased to such an amount as to require removal. As the normal slag has a high fusion point, a flux is added to render it more liquid, and the remaining alloy and slag are finally run out through the metal taphole. The furnace is then charged anew and the process is repeated.

It is important that the ferrochromium produced should be low in carbon. The amount of carbon in the charge is therefore kept at a minimum. On account of the low percentage of admixed carbon, however, highly-oxidizing gases are evolved in contact with the depending electrode, which is soon consumed and must be replaced. The air also acts rapidly on the hot electrode when the furnace is emptied by the removal of slag. Since the charge is a fairly good conductor of electricity, a thin layer only is maintained around the lower end of the depending electrode to prevent excessive shunting of current to the carbon sides of the furnace, under the high applied potential. Much heat is therefore lost by radiation from the zone of reduction through the charge, while the electrode is insufficiently protected from oxidation by the air. This loss of heat greatly decreases the reduction efficiency of the furnace. Furthermore the slag is not kept at a sufficiently high temperature to permit it to be tapped out, except by adding large amounts of flux, discontinuing the charge of ore and employing the energy of the arc merely to liquefy the slag. The heat losses are also increased by the discontinuous mode of working, both the furnace and the depending electrode cooling down when the furnace is empty. It is also impracticable to effect a clean separation of the metal and slag by removing them successively through a single tap-hole.

According to the present invention the production of ferrochromium and similar alloys is effected in an incandescence furnace by a continuous operation, the charge being heated to the temperature of reduction by an adjacent resister of molten slag, interposed between the charge and body of reduced metal and serving to maintain the metal out of contact with the carbon in the charge. It is thereby possible to produce ferrochromium containing a small percentage of carbon.

A suitable furnace is shown in the accompanying drawing, in which the figure is a transverse vertical section, in the plane of the electrodes and at right angles to the tap-holes.

The furnace illustrated comprises side walls 1 and a bottom 2 of suitable refractory material, such as magnesia fire-brick. Tap-holes 3, 4 for metal and slag extend through one wall. Electrodes 5, 6 of opposite polarity depend into the furnace. A body of molten metal 7 occupies the lower part of the furnace. Upon this metal is a deep body of molten slag 8. The charge-mixture 9, which may consist of chromite, coke, lime or other usual materials, is carried by and extends downward into the molten slag. The body of slag is heated to the temperature requisite for reduction by an electric current passed through it between the electrodes 5, 6 and as reduction proceeds, the iron and chromium alloy, and the alloy settles through the slag into the layer of metal beneath. The slag produced by the reduction combines with the slag-resister 8 and the excess slag and metal are removed from time to time through the tap-holes, additions being made to the charge as required. The reduced metals thus quickly separate from and are maintained out of contact with the free carbon in the charge, the resulting alloy therefore being low in carbon. The charge-mixture, surrounding the upper portions of the electrodes, serves to protect them from oxidation and prevents the escape of heat from the zone of reduction.

I claim:

1. The resistance process of producing ferrochromium, which consists in passing an electric current through a slag-resister adjacent to a charge containing carbon and combined iron and chromium and thereby heating the charge to the temperature of reduction, and separating and maintaining the resulting alloy out of contact with the carbon in the charge.

2. The resistance process of producing ferrochromium, which consists in passing an electric current through a slag-resister adjacent to a charge containing carbon and combined iron and chromium and thereby heating the charge to the temperature of reduction, and separating and maintaining the resulting alloy out of contact with the carbon in the charge by an intermediate layer of slag.

In testimony whereof, I affix my signature in presence of two witnesses.

EDGAR F. PRICE.

Witnesses:
 EUGENE A. BYRNES,
 DEAN BURGESS.